United States Patent [19]

Hixson, II

[11] Patent Number: 5,476,272

[45] Date of Patent: Dec. 19, 1995

[54] SPEED SENSOR RING FOR VEHICLE ANTI-LOCK BRAKE SYSTEM

[75] Inventor: Kenneth L. Hixson, II, Canton, Mich.

[73] Assignee: Federal-Mogul Corporation, Southfield, Mich.

[21] Appl. No.: 184,095

[22] Filed: Jan. 19, 1994

[51] Int. Cl.⁶ .............................. F16J 15/32; G01B 7/15; G01P 3/481

[52] U.S. Cl. .................... 277/152; 324/173; 324/207.22; 301/105.1; 384/448; 277/2

[58] Field of Search .................................. 301/6.1, 105.1; 280/432; 73/5, 488, 493, 494; 324/173, 174, 207.22; 277/212 FB, 152, 153, 2; 188/181 R; 384/446, 448

[56] References Cited

U.S. PATENT DOCUMENTS

| | | | |
|---|---|---|---|
| 3,854,556 | 12/1974 | Gee | 188/181 R |
| 4,107,601 | 8/1978 | Bareier, Jr. et al. | 324/173 |
| 4,161,120 | 7/1979 | Cloarec | 73/494 |
| 4,171,818 | 10/1979 | Moskowitz | 277/80 |
| 4,560,177 | 12/1985 | Riley, Jr. | 277/152 X |
| 4,667,156 | 5/1987 | Machino et al. | 73/494 X |
| 4,986,605 | 1/1991 | Descombes | 301/105.1 |
| 5,002,287 | 3/1991 | Eskilsson | 277/2 |
| 5,011,303 | 4/1991 | Caron | 324/173 X |
| 5,015,001 | 5/1991 | Jay | 277/152 X |
| 5,183,269 | 2/1993 | Black et al. | 277/152 X |
| 5,186,472 | 2/1993 | Romero et al. | 277/152 X |
| 5,200,698 | 4/1993 | Thibaud | 324/207.22 |
| 5,232,239 | 8/1993 | Hawkins et al. | 280/432 |
| 5,296,805 | 3/1994 | Clark et al. | 324/174 |
| 5,407,213 | 4/1995 | Ouchi et al. | 277/2 |

FOREIGN PATENT DOCUMENTS

| | | | |
|---|---|---|---|
| 0213732 | 3/1987 | European Pat. Off. | 324/174 |
| 2669598 | 11/1991 | France . | |
| 3411773 | 5/1985 | Germany . | |
| 3443522 | 6/1986 | Germany . | |
| 3006458 | 1/1991 | Japan | 73/494 |

Primary Examiner—Russell D. Stormer
Attorney, Agent, or Firm—Lawrence J. Shurupoff

[57] ABSTRACT

An anti-lock brake system includes a relatively low cost, toothed ring for sensing vehicle speed. The toothed ring can be molded out of an elastomeric material containing finely divided particulates that are magnetically permeable. The molded, toothed ring includes magnetically permeable projecting teeth which magnetically interact with a magnetic field generated in a speed sensor to provide a pulsating voltage related to vehicle wheel speed. The toothed ring can be an integral part of an oil seal or wear sleeve positioned between a vehicle axle and wheel hub.

4 Claims, 2 Drawing Sheets

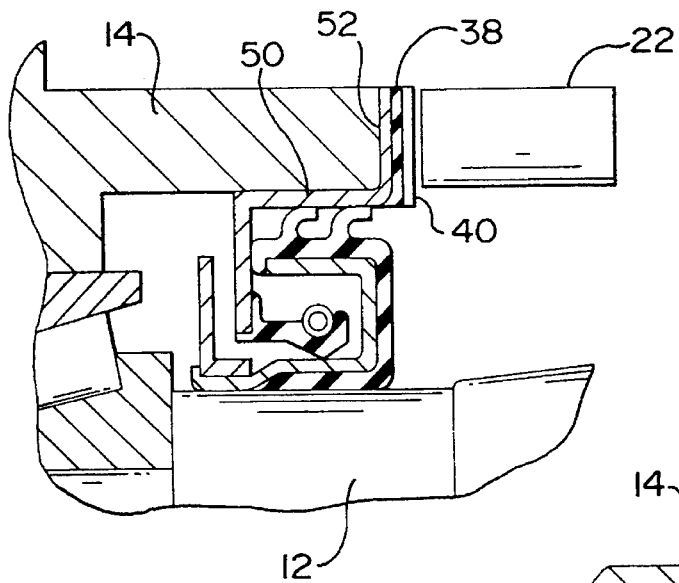
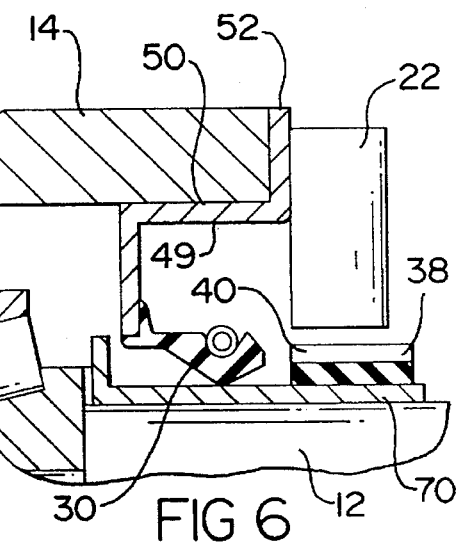
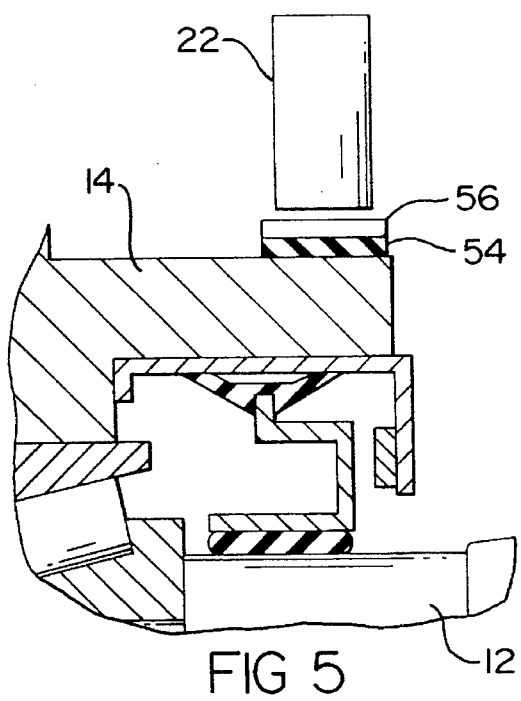

1

SPEED SENSOR RING FOR VEHICLE ANTI-LOCK BRAKE SYSTEM

BACKGROUND OF THE INVENTION

1. Field of the Invention

The present invention relates in general to vehicle anti-lock brake systems, and particularly to a speed sensor ring used in such systems.

2. Description of Prior Developments

Anti-lock braking systems commonly include a vehicle speed sensor assembly for generating a pulsed electrical signal related to vehicle speed. During a vehicle braking operation, the speed signal is sent to an on-board computer that responds to the drop in vehicle speed. If there is an impending wheel lock-up condition, the computer directs a valve in the brake system to relieve or modulate the fluid pressure within the rear wheel brake cylinders thereby preventing the undesired wheel lock-up condition. When the computer determines that a lock-up condition is no longer imminent, the braking pressure is returned to normal.

The speed sensor assembly commonly includes an annular metal rotor attached to the brake drum so as to be rotatable with the road wheel. The metal rotor has a large number of radial slots evenly spaced around its rotor circumference. Typically, there may be about one hundred such slots.

The speed sensor assembly further includes a stationary voltage generator that generates an A.C. signal as the rotor passes across it. The voltage generator or speed sensor contains a permanent magnet and an electrical coil such that the radial slots of the rotor disrupt the magnetic field to provide an A.C. signal in the coil related to road wheel speed. The signal is sent to an on-board computer for controlling the vehicle braking operation.

The slotted metal rotor usually includes a radial or axial wall containing the slots and a circular flange or cylinder encircling the wheel hub. In one case, five or more ears may project radially from the rotor outer edge for mounting the rotor on the rear wall of the brake drum or housing.

The slotted metal rotor is somewhat costly to manufacture. Also, the installation cost of the rotor can be significant due to the fact that several screws have to be extended through the mounting ears into threaded holes in the rear wall of the brake housing or a separate crimping operation or press fit is required.

SUMMARY OF THE INVENTION

The present invention is directed to a low cost rotor construction for a vehicle speed sensor adapted for use in an anti-lock brake system. The rotor construction is designed to be carried by the wheel hub rather than by the brake drum, as is the common practice. A principal feature of the invention is that the rotor is formed as an annular toothed ring having a large number of square edged teeth. The toothed ring is preferably formed of a non-metallic molded material, e.g., molded rubber or plastic, having relatively fine magnetic particles distributed throughout the molded material, whereby the projecting teeth become magnetically permeable.

The rotor construction of the present invention is designed to be used with existing speed sensors (voltage generators). As the road wheel rotates, the rotor passes by or across the speed sensor such that the spaces between the teeth act as slots to disrupt the magnetic field generated by the magnet in the speed sensor.

In one form of the invention, the molded toothed ring is formed as an integral part of an annular shaft seal or oil seal that is used to contain lubricating oil in anti-friction wheel bearings that mount the rotary wheel hub on the vehicle axle. Commonly, the annular oil seal has a rotating seal component that includes a metal case press-fit into the end of a rotary wheel hub. The conventional metal case is modified to have an annular flange extended beyond the hub end surface. The toothed ring of the present invention may be molded around the annular flange so that the toothed ring becomes an integral part of the oil seal. The molded toothed ring is installed on the wheel hub as an incident to the operation of installing the oil seal within the axle-hub interface.

In a second form of the invention, the molded toothed ring is formed separately from the oil seal such that the ring is adapted for direct placement against or around the outer surface of the wheel hub. The inner diameter of the molded ring, in the as-formed state, is slightly less than the outer diameter of the wheel hub such that the ring can be stretched slightly for secure placement on the hub. The teeth of the molded ring project radially outwardly away from the hub outer surface for magnetic interaction with the stationary speed sensor.

BRIEF DESCRIPTION OF THE DRAWINGS

In the drawings:

FIG. 4 is a fragmentary sectional view taken through a second rotor embodying the invention. FIG. 4 also shows an oil seal assembly between the axle and the rotary wheel hub. The toothed rotor constitutes an integral part of the seal assembly.

FIG. 5 is taken in the same direction as FIG. 4 but showing the toothed rotor formed separately from the oil seal assembly. The toothed rotor extends around the outer surface of the wheel hub with a friction fit thereon.

FIG. 6 is a fragmentary sectional view taken through another construction embodying the invention.

DETAILED DESCRIPTION OF THE PREFERRED EMBODIMENTS

Figure 1:
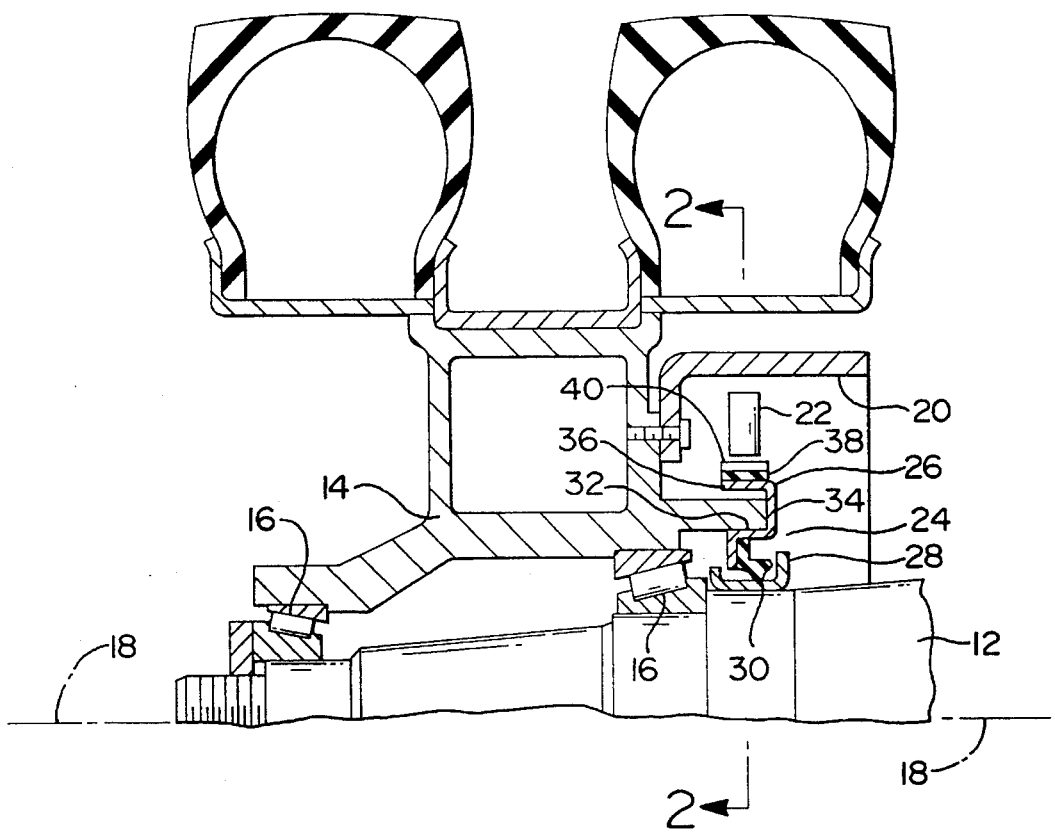
FIG. 1 is a fragmentary sectional view taken through the rear axle of a truck and showing a magnetic rotor of the present invention installed on an associated wheel hub.
Figure 2:
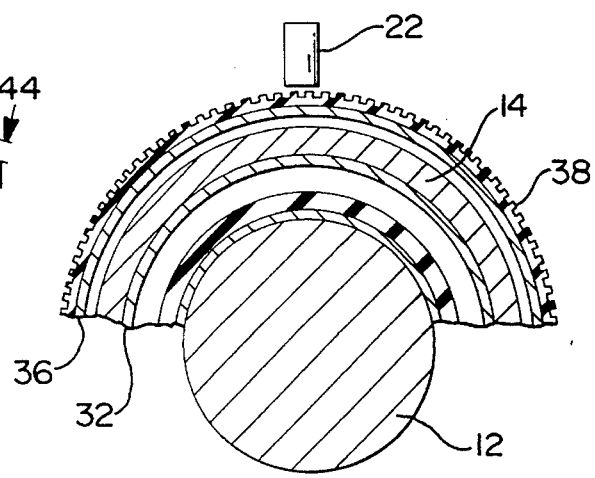
FIG. 2 is a fragmentary sectional view taken on line 2—2 in FIG. 1.

Referring to FIGS. 1 and 2, there is shown a truck axle-wheel assembly suitable for using the toothed rotor of the present invention. The assembly includes a stationary axle 12 and a rotating wheel hub 14. Anti-friction bearings 16 support the wheel hub for free rotation around the shaft axis 18. A conventional brake drum or housing 20 is bolted to the inboard surface of the wheel hub.

FIG. 1 schematically shows a conventional speed sensor 22 stationed within the brake drum for sensing or detecting the wheel speed. Sensor 22 is affixed in a known fashion to a non-illustrated mounting structure carried by the axle such that sensor 22 has a stationary fixed position.

An annular oil seal assembly 24 is arranged between the fixed axle and the inboard end of the wheel hub for retention of lubricating oil in the wheel bearings. The oil seal assembly includes an outer metal case 26 secured to the wheel hub and an inner metal case 28 secured to the axle. An elastomeric sealing member 30 is carried by outer case 26 for rotary sliding contact with the cylindrical side surface of case 28, whereby the interface between the axle and wheel hub is sealed against the escape of lubricant from the wheel bearings. Inner case 28 forms a wear sleeve for the sealing element 30.

Metal case 26 includes an axial tubular wall 32 that has a press-fit within or against the inner surface of wheel hub 14, a second radial wall 34 extending along the annular end surface of the wheel hub and a third tubular metal wall 36 extending along the hub outer surface.

Metal wall 36 forms a mounting surface for an annular toothed ring 38 that forms a magnetic rotor of the present invention. Ring 38 is formed out of a non-metallic molded material, preferably an elastomer having the same formulation as sealing member 30. Ring 38 could be formed out of other materials suitable for molding into toothed ring configurations. However, ring 38 may be molded concurrently with the molding of seal element 30 using a single elastomer formulation and a single molded cavity to produce the sealing member and the toothed ring in a single molding operation.

The elastomer is compounded with powdered or granulated magnetically permeable materials so that the molded ring 38 is magnetically active. Mixing of the particulate material with the elastomer is carried out so that the magnetic particles are evenly dispersed throughout the molded ring 38. The magnetic particles permeate the sealing element but without any appreciable adverse effect on the sealing action. The molded elastomer is magnetically permeable while still being flexible and otherwise suitable for use as a sealing member and as a magnetic rotor.

The magnetic particles can, for example, be iron oxide ($Fe_3O_4$) or barium ferrite powder. The addition of the magnetic particles to the elastomer somewhat changes the properties of the elastomer but not to such an extent as to interfere with the sealing action of the molded sealing element 30. The particulate material produces a decrease in the elastomer tensile strength and an increase in the elastomer hardness.

It is also possible to use separate elastomers for the seal element 30 and ring 38. For example, an inexpensive elastomer such as rubber may be used for the ring 38 since the ring may not need to provide any sealing capabilities. In this case, the seal element 30 may be molded from a more expensive material such as fluoroelastomer which is more expensive, but particularly well suited to rotary lip seal applications.

Figure 3:
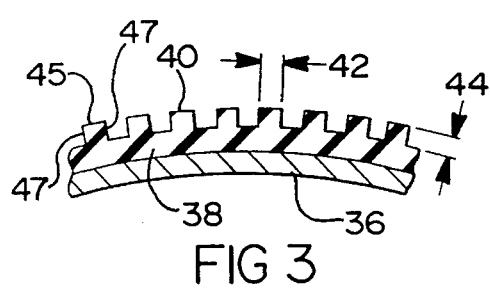
FIG. 3 is a fragmentary enlarged view of a toothed ring structure that constitutes the magnetic rotor depicted in FIG. 2.

As shown in FIG. 3, molded ring 38 has a large number of integral teeth 40 projecting radially outwardly from the ring circumferential plane. Typically, the ring may have about one hundred teeth. In one embodiment, each tooth can have a width dimension 42 measuring about 0.07 inch and a depth dimension 44 measuring about 0.08 inch. The circumferential spacing of the teeth is then preferably about 0.07 inches, i.e. the same as the tooth width dimension.

Each tooth 40 has an essentially flat outer edge 45 and two flat parallel side edges 47. The junctures between the tooth outer edge 45 and the side edges 47 form square corners, whereby each tooth has a sharp edged rectangular profile as viewed in FIG. 3.

Speed sensor 22 is of a known sensor construction presently used in vehicle anti-lock braking systems for sensing wheel speed. During wheel hub rotation, the teeth 40 on molded ring 38 successively pass across the sensing end of sensor 22 so as to magnetically interact with the magnetic field generated by a permanent magnet contained within the sensor. An electric coil associated with the permanent magnet generates an electric voltage that is transmitted through the sensor lead wiring to a computer (not shown). The magnetically permeable teeth 40 on ring 38 complete the magnetic circuit, whereas the tooth spaces interrupt the magnetic circuit such that a pulsating voltage related to wheel hub speed is generated in the coil.

The illustrated toothed ring construction is advantageous over known rotor constructions in that the toothed ring is formed as an incident to the molding operation used for forming the sealing element 30. One molding operation can form both the sealing element and the toothed rotor. Alternatively, two separate molding steps may be used to separately form seal 30 and ring 38. The same or different materials may be used for each molding operation.

Teeth 40 are configured with flat outer edges and parallel side edges in order to achieve a sharper change in the coil voltage, i.e. a more abrupt disruption of the magnetic circuit and a more abrupt restoration of the magnetic circuit.

FIG. 4 shows another form that the invention can take. In the FIG. 4 arrangement, the outer metal case of the seal assembly includes a tubular wall 50 press-fit over the concave inner surface of wheel hub 14 and a second radial wall 52 extending along the annular end surface of the wheel hub. The toothed ring 38 is molded onto radial wall 52 so that the associated teeth 40 project axially away from the hub. As in the case of the FIG. 1 construction, the toothed ring 38 has magnetically permeable particles evenly dispersed throughout the elastomer.

The FIG. 4 construction is used in situations where the speed sensor 22 is oriented axially. Operationally, the rotor construction of FIG. 4 is the Same as the FIG. 1 construction. The sealing element configuration can be varied while still practicing the invention. FIG. 4 shows an oil seal assembly having multiple redundant sealing elements. Other sealing element configurations can be used, as shown in U.S. Pat. No. 5,015,001.

FIG. 5 shows another form of the invention, wherein the molded toothed ring or rotor is formed separately from the seal assembly. The teeth on the molded ring will be configured as shown in FIG. 3. Also, particulate magnetic material will be mixed into the elastomer formulation to make the teeth magnetically permeable.

The rotor shown in FIG. 5 includes a molded annular ring element 54 having integral teeth 56 projecting radially outwardly from the ring outer diameter. In its as-formed state, the molded ring structure may have an internal diameter that is slightly less than the diameter of the wheel hub outer surface. The molded ring structure is installable on the hub outer surface by slightly stretching the ring structure and sliding it axially onto the hub outer surface. The installed ring structure is in a tensioned condition with the teeth remaining rigid even under high hub rotational speeds. Adhesives can be applied to the ring inner surface to ensure a secure connection between the ring and the hub surface.

FIG. 6 illustrates an arrangement wherein the speed sensor 22 is mounted on the rotating component of the wheel assembly and the toothed ring is mounted on the stationary component of the wheel assembly. As shown, toothed ring 38 is bonded or vulcanized to the outer cylindrical surface of an annular wear sleeve 70 carried by stationary axle 12. The speed sensor 22 is mounted on the radial wall 52 of a metal case 49. The metal case includes a tubular axial wall 50 press-fit against the inner surface of a wheel hub 14.

The metal case 49 serves to mount an elastomeric sealing element 30 having a known construction. Sealing element 30 has a sealing lip that rides on the outer surface of wear sleeve 70 to seal the interface between rotary hub 14 and stationary axle 12. While hub 14 is rotating, the speed sensor 22 moves around and over the toothed ring 38 to generate a speed signal. Ring 38 includes a non-metallic molded material having magnetic particulates or particles evenly dispersed therein, such that the teeth 40 on the ring magnetically interact with the magnetic field generated by the coil in the speed sensor.

The invention relates to an improved magnetic rotor construction cooperable with conventional speed sensors in anti-lock braking systems. The rotor construction may be mounted on or mountable on the inboard end of the rotary wheel hub. As depicted in FIGS. 1 and 5, the magnetic rotor includes a generally cylindrical toothed ring structure cooperable with a radially oriented speed sensor. As depicted in FIG. 4, the magnetic rotor includes an annular radially oriented toothed ring cooperable with an axially oriented speed sensor.

The preferred toothed ring structure is a molded nonmetallic member having finely divided, magnetically permeable particles dispersed therein. The molded ring structure can be an integral part of an otherwise conventional oil seal, as shown in FIGS. 1 and 4. Alternately, the toothed ring structure can be a separately formed annular unit adapted for placement around the wheel hub, as depicted in FIG. 5.

The molded non-metallic member is preferably formed out of an elastomer together with finely divided, magnetic particulates. However, other non-metallic moldable materials such as plastics can be used. When the toothed ring is incorporated into an oil seal, the moldable material for the toothed ring may be the same or a different material that is used for the sealing elements. In either case, the rotary sealing structure can be formed as an entirety in a single molding operation using one or two different elastomers. The oil seal may be of the unitized type.

What is claimed is:

1. A shaft seal assembly for sealing lubricant between an axle and a wheel hub of a vehicle and for providing a pulsed signal representative of vehicle speed, said seal assembly comprising:

an annular metal seal case adapted for press fit mounting between said axle and said hub, said seal case defining a first metal wall and a second metal wall;

an elastomeric sealing member molded to said first metal wall; and an annular toothed ring mounted on said second metal wall, said toothed ring comprising a nonmetallic material shaped into a plurality of teeth.

2. The seal assembly of claim 1, wherein said nonmetallic material comprises an elastomer containing magnetically permeable particulates.

3. A shaft seal assembly for sealing lubricant between an axle and a wheel of a vehicle and for providing a pulsed signal representative of vehicle speed, said seal assembly comprising:

an annular metal seal case adapted for press fit mounting on said wheel;

an annular sealing member mounted on said metal seal case;

an annular metal wear sleeve adapted for press fit mounting on said axle; and a plurality of circumferentially spaced teeth projecting from said wear sleeve, said teeth comprising a nonmetallic material shaped into said plurality of teeth.

4. The shaft seal assembly of claim 3, wherein said nonmetallic material comprises an elastomer containing magnetically permeable particulates.

\* \* \* \* \*